US009528626B2

(12) United States Patent
Holmes et al.

(10) Patent No.: US 9,528,626 B2
(45) Date of Patent: Dec. 27, 2016

(54) MONO BEARING ONE PIECE CORE SOLENOID

(71) Applicant: BorgWarner Inc., Auburn Hills, MI (US)

(72) Inventors: Garrett R. Holmes, Lake Orion, MI (US); David C. Mills, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/373,499

(22) PCT Filed: Jan. 22, 2013

(86) PCT No.: PCT/US2013/022449
§ 371 (c)(1),
(2) Date: Jul. 21, 2014

(87) PCT Pub. No.: WO2013/116031
PCT Pub. Date: Aug. 8, 2013

(65) Prior Publication Data
US 2014/0361206 A1 Dec. 11, 2014

Related U.S. Application Data

(60) Provisional application No. 61/592,185, filed on Jan. 30, 2012.

(51) Int. Cl.
F16K 31/06 (2006.01)
H01F 7/08 (2006.01)
(Continued)

(52) U.S. Cl.
CPC ............ *F16K 31/0668* (2013.01); *F16K 3/26* (2013.01); *F16K 27/048* (2013.01);
(Continued)

(58) Field of Classification Search
CPC .. F16K 31/06; F16K 31/0613; F16K 31/0655; F16K 31/0675; F16K 27/029; F16K 27/048
(Continued)

(56) References Cited

U.S. PATENT DOCUMENTS 4,278,959 A * 7/1981 Nishimiya ............ H01F 7/1607
335/251
4,647,008 A * 3/1987 Shirai ................. F16K 31/0655
251/129.07
(Continued)

FOREIGN PATENT DOCUMENTS

WO 2010117477 10/2010

*Primary Examiner* — Matthew W Jellett
(74) *Attorney, Agent, or Firm* — Warn Partners, P.C.

(57) ABSTRACT

A solenoid valve assembly is provided which includes a ferromagnetic casing forming a generally tubular envelope, a flux tube integrally formed with the casing and extending axially generally there from defining and axially extending annular space there between, the flux tube having a first portion connected with the casing and a second portion integral with the first portion be divided there from by a flux choke, and also including an armature aligned and slidably mounted within the flux tube for imparting movement to a valve member.

15 Claims, 2 Drawing Sheets

(51) Int. Cl.
*H01F 7/16* (2006.01)
*F16K 27/04* (2006.01)
*F16K 3/26* (2006.01)

(52) U.S. Cl.
CPC ......... *F16K 31/0613* (2013.01); *H01F 7/081* (2013.01); *H01F 7/1607* (2013.01)

(58) Field of Classification Search
USPC .................................................. 251/129.15
See application file for complete search history.

(56) References Cited

U.S. PATENT DOCUMENTS

| | | | |
|---|---|---|---|
| 4,998,559 A | 3/1991 | McAuliffe, Jr. | |
| 5,056,556 A | 10/1991 | Nishimoto et al. | |
| 6,336,470 B1 | 1/2002 | Zapf | |
| 6,343,621 B1 | 2/2002 | Holmes et al. | |
| 6,547,215 B2* | 4/2003 | Matsusaka | F16K 31/0613 137/375 |
| 6,806,802 B2 | 10/2004 | Oishi et al. | |
| 7,075,394 B2 | 7/2006 | Matsusaka et al. | |
| 7,331,565 B2 | 2/2008 | Mills et al. | |
| 7,584,937 B2 | 9/2009 | Oishi | |
| 8,070,129 B2* | 12/2011 | Makino | F16K 27/041 251/129.15 |
| 8,154,370 B2* | 4/2012 | Ishibashi | H01F 7/081 251/129.15 |
| 8,191,858 B2* | 6/2012 | Kam | B60T 8/363 251/129.15 |
| 8,375,973 B2* | 2/2013 | Barnish | F16K 31/0648 137/15.18 |
| 8,556,232 B2* | 10/2013 | Oikawa | F16K 31/0613 251/129.01 |
| 8,585,014 B2* | 11/2013 | Oikawa | F16K 11/0716 251/129.15 |
| 2006/0243938 A1 | 11/2006 | Ishibashi et al. | |
| 2010/0301978 A1* | 12/2010 | Ishibashi | H01F 7/1607 335/255 |
| 2014/0367595 A1* | 12/2014 | Miura | F16K 31/0696 251/64 |

* cited by examiner

MONO BEARING ONE PIECE CORE SOLENOID

FIELD OF THE INVENTION

The present invention relates to solenoid valves, especially solenoid valves utilized in the control of hydraulic control fluids and such valves that can function submerged (immersed) in hydraulic fluid.

BACKGROUND OF THE INVENTION

Automotive automatic transmissions typically have a plurality of components including torque convertors and clutches wherein states of engagement and disengagement must be controlled. Initially such components were controlled with fluid pressure logic components. In an era approximately beginning in the 1980's, more and more automotive transmissions have been brought forth wherein the control of the torque convertor and clutches has been taken over by electronic logic controls which utilize solenoid valves to control the hydraulic control fluid which actuates or relieves the operation of the various fluid pressure actuated components of the transmission. Currently, many of these solenoid valves are hermetically sealed within the transmission fluid. Accordingly, the solenoid actuated valves are submerged within the hydraulic fluid.

Most solenoid valves utilized in vehicle automotive transmissions have a coil wrapped in a non-magnetic bobbin. Encasing the coil and providing a portion of the magnetic loop of the solenoid valve is a casing. On an interior diameter of the bobbin is typically a flux tube and a pole piece. Slidably mounted inside the flux tube and pole piece is an armature which contacts a valve member. To align the flux tube and pole piece and to maintain a close axial separation between the flux tube and pole piece, there is provided a non-magnetic material alignment tube. An example of such a solenoid valve can be found by a review of PCT Patent Application No. PCT/US2010/021924.

Due to manufacturing variations, the current/force operation of individual solenoid valves can vary slightly. To achieve the optimum performance in a transmission, it is desirable that the solenoid valves be calibrated. Previously, calibration was done mechanically, but it has been found preferable that calibration of the solenoid valves be achieved utilizing a software methodology as revealed in U.S. Pat. No. 7,474,948. When the solenoids are calibrated electronically, it is desirable that the operation of the solenoids be consistant over the lifetime of its operation within the transmission as much as possible. As previously mentioned, solenoids in automotive transmissions are often submerged within the transmission fluid. During operation of the vehicle and due to wear of the various gears, shafts and bearings of the transmission, metallic particles are generated as contaminants in the transmission fluid. These contaminants can often become lodged within the solenoid valves since they are attracted to the magnetic fields which permeate the solenoid valves. As mentioned previously, most solenoid valves have a casing and a separate flux tube and pole piece. Where there are interfaces between the various components, over process of time, metallic components can become lodged within the interfaces between the various components. When metallic components become lodged within the interface of the various components, the flux efficiency or density of the various components can be modified thereby changing the operation of the solenoid valve away from its initial calibrated setting. It is desirable to provide a solenoid valve which especially in submerged environments will have a more constant operation over time regardless of the presence of metallic contaminants from the hydraulic fluid that the solenoid valve is submerged within.

SUMMARY OF THE INVENTION

To make manifest the above noted and other desires, a revelation of the present invention is brought forth. In a preferred embodiment of the present invention, a solenoid valve is provided which has a unitary case, flux tube and pole piece. Accordingly, discontinuities between the casing, flux tube and pole piece are eliminated and operation of the solenoid valve is more consistent over time. Additionally, other operational enhancements are made such that the flux density of the solenoid valve is enhanced in a manner to be later described.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
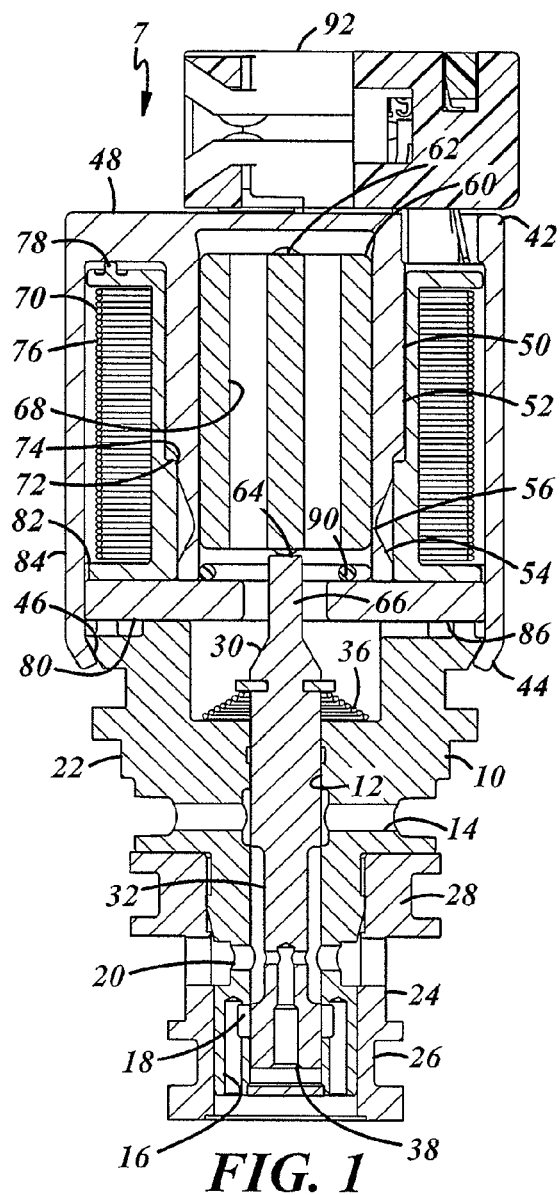
FIG. 1 is a sectional view of a normally low control pressure solenoid valve according to the present invention.

Referring to FIG. 1, an immersable solenoid valve 7 according to the present invention can have a valving member including a hydraulic body 10. The hydraulic body 10 has an axial generally tubular passage 12. The hydraulic body 10 has a transverse cross bore 14 for connection with exhaust pressure or a sump. The hydraulic body 10 additionally has a series of non-concentric axial bores 16 which intersect an enlarged diameter portion 18 to provide a fluid path which is connected with supply pressure. A multi-dimensional cross bore 20 is provided for inlet/outlet connection with a desired control pressure. The hydraulic body 10 has a metallic primary body 22 and has a lower tip covered by an outer sleeve member 24 having annular grooves 26 and 28 for placement of sealing members (not shown).

Slidably mounted within the tubular passage 12, to control fluid flow between the control inlet/outlet 20 and the supply inlet passage 16 and the exhaust outlet 14 is a spool valve 30. The spool valve 30 has a landing 32 which can also alternately connect pressurized supply 16 with the control inlet/outlet 20 or the exhaust 14 with the control inlet/outlet 20. The spool valve 30 is biased by a spring 36 and is pressure biased by a balancing chamber 38 provided in the bottom of the hydraulic body 10.

The solenoid valve 7 is also provided with a ferromagnetic casing 42. The casing 42 along its lower end has a series of slots to aid in their bending over of tabs 44 which contact an inclined portion 46 of the hydraulic housing to capture the same to the casing. The casing 42 is generally open along its lower end and is closed on its top end 48. The casing 42 forms a generally tubular envelope. The casing 42 may be machined, deep drawn or forged.

Integrally formed with the casing and extending axially generally there from is a flux tube 50. The flux tube 50 defines an annular axially extending space between its outer diameter and an inner wall of the casing 42. The flux tube 50 has a first portion 52 integrally connected with a second pole piece portion 54 and divided there from by a flux choke 56.

Slidably mounted and aligned by the flux tube 50 is an armature 60. Typically, the armature will be a ferro magnetic material which has its outer diameter coated with a non-magnetic material such as nickel. The armature 60 has a contact dimple 62 for preventing magnetic latching with the top end 48 of the casing. The armature 60 also has a lower dimple 64 for contacting and imparting movement to a stem portion 66 of the spool valve 30. The armature also has a series of longitudinal slots 68 to allow for passage of hydraulic fluid during transient movements of the armature.

Axially insertable and positioned within the annular axially extending space between the casing 42 and the flux tube 50 is a coil and bobbin assembly 70. The coil and bobbin assembly along its inner diameter has an optional shoulder 72 contacting a corresponding optional shoulder 74 of the flux tube 50. The coil 76 is actuated to activate movement of the armature 60. As well known to those skilled in the art, the bobbin is typically made from a non-metallic material and often a polymeric material is specified for this part. The top of the bobbin has a crush tower 78. Axially abutting the coil bobbin assembly 70 and a lower end of the pole piece portion 54 of the flux tube 50 along its upper axial face 82, is a flux washer 80. The flux washer 80 magnetically connects an axial end of the pole piece portion of the flux tube 50 with the casing 42 via its radial interference interface 84. A bottom axial surface 86 is sealably abutted with the hydraulic body 10. The flux washer 80 top axial surface 82 also compresses and sealably engages the bobbin 71 along a plane coterminous with an axial end of flux tube 50.

Solenoid 7 also has a travel stop 90 which is a non-magnetic material such as copper wire which prevents the armature from bottoming out or magnetically latching on the flux washer 80. An electrical connector 92 is provided for delivering a current to the coil 76. Activation of the solenoid 7 occurs by transmitting a current through the coils 76. This current will generate a magnetic field having its highest current density generally in an area wherein the flux tube 50 connects with the casing 42. Since there are no discontinuities in the area wherein the flux tube 50 connects with the casing, flux density is enhanced in relation to prior solenoids and for a given fixed electrical current; the force of actuation of the armature 60 is increased as related to the prior solenoid assemblies. A flux loop will be formed encasing the upper portion of the casing into the flux tube 50. Due to the flux choke, the flux loop will skip into the armature and then out through the armature to the pole piece portion 54. The flux loop will cause the armature 60 to attempt to reach the point of least reluctance; therefore causing the armature 60 to move downward so that a flux loop is formed from the upper portion of the flux tube into the armature and then out of the armature into the pole piece portion of the flux tube 54 down into the flux washer 80 and then back into the casing 42. The downward movement of the armature 60 towards the hydraulic body 10 causes the normally low solenoid to push the spool valve 30 downwards causing the landing 32 to connect the supply inlet 16 with the control pressure inlet/outlet 20.

Figure 2:
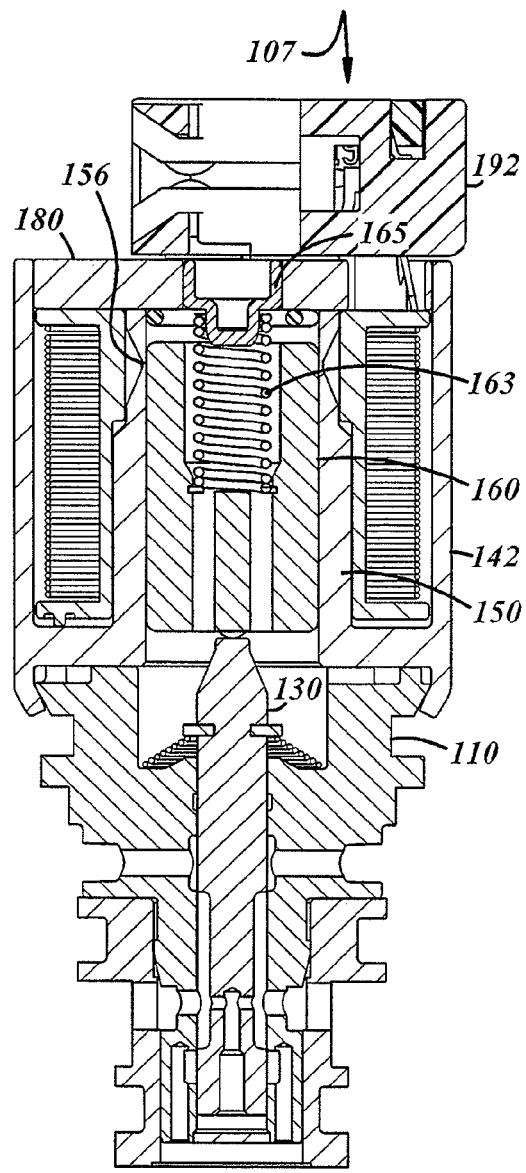
FIG. 2 is a sectional view of a normally high control pressure solenoid valve according to the present invention.

Referring to FIG. 2, a normally high solenoid 107 is provided. Solenoid 107 is a normally high solenoid meaning that the supply is normally connected with control pressure when current is not applied. When solenoid 107 is actuated, the armature 160 moves upward against the force of a biasing spring 163. The hydraulic body 110 of solenoid 107 is similar to that of the hydraulic body 10 of FIG. 1. The spool valve 130 is also similar to previously described spool valve 30 with the exception that it does not have the stem portion 66. The case 142 of solenoid valve has its generally open end extending upwards away from the hydraulic body 110. The flux tube 150 has its flux choke 156 adjacent to an end of the flux tube 150 which is opposite the hydraulic body 110. A flux washer 180 is provided on an end of the casing 142 that is generally opposite the hydraulic body 110 and the flux washer also mounts an electrical connector 192. A mount 165 is positioned within the aperture of the flux washer 180 to position the biasing spring 163.

Figures 3, 4:
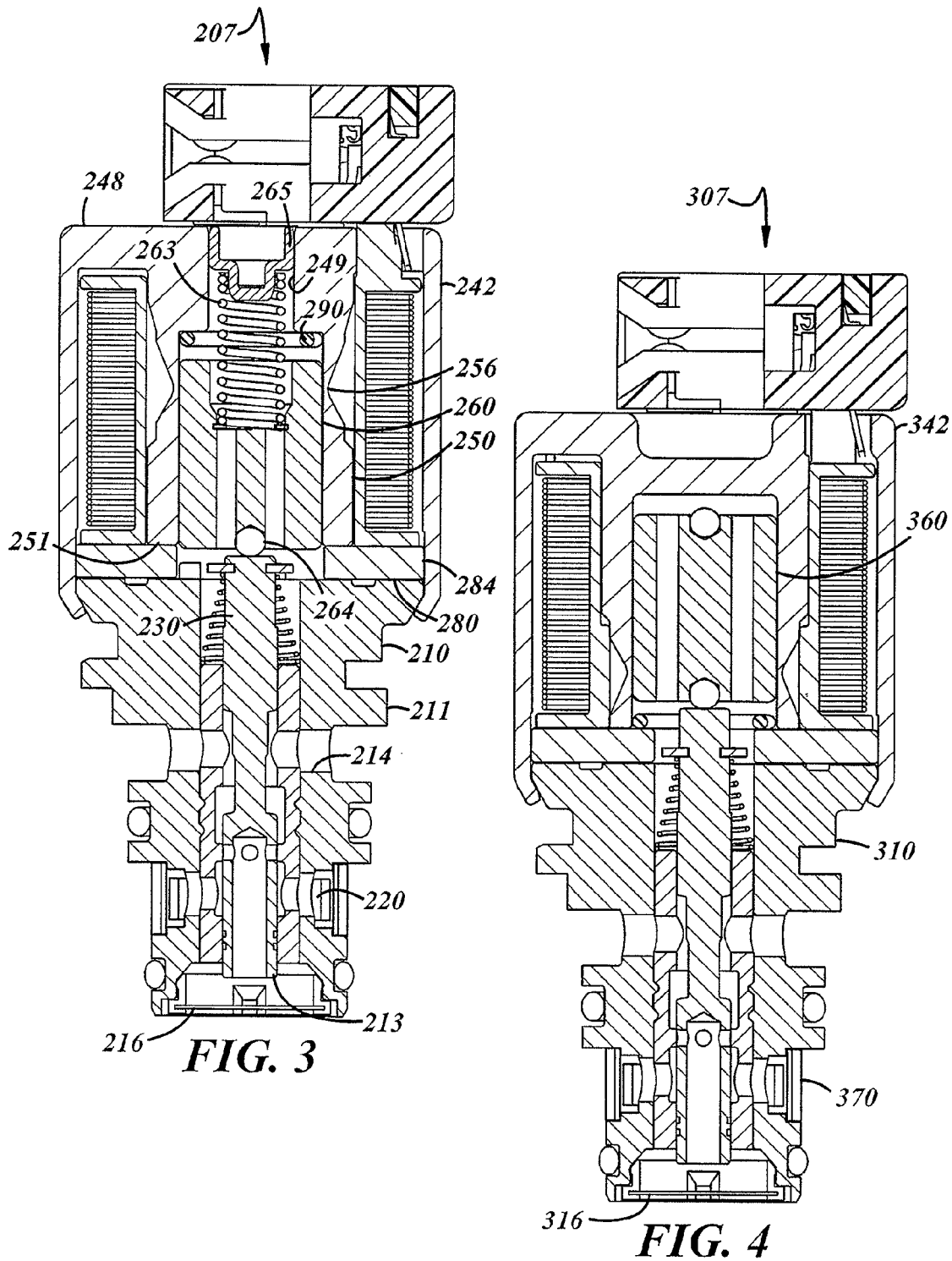
FIG. 3 is a sectional view of another normally high control pressure solenoid valve of the present invention.
FIG. 4 is a sectional view of another normally low control pressure solenoid valve of the present invention.

Referring to FIG. 3, a normally high solenoid 207 is provided. Solenoid 207 varies from solenoids 7 and 107 in that it has a hydraulic body 210 having an outer polymeric part 211 with an inner metallic liner 213. A cross bore 220 of the hydraulic body 210 is connected with supply and the control is connected with an axial inlet/outlet 216. An exhaust inlet/outlet passage is provided by cross bore 214. A spring biased spool valve 230 engages with an armature 260 via a crown member 264. The solenoid valve 207 differs from solenoid valve 7 and 107 in that the flux choke 256 is on an end of the flux tube 250 somewhat closer to a closed end 248 of the casing 242. The closed end 248 of the casing has a penetrating aperture 249 to allow for placement of a spring mount 265 for the biasing spring 263. In a manner similar to that of solenoid 7, a flux washer 280 abuts the axial ends 251 of the flux tubes 250. The outer radial edge 284 of the flux washer 280 has radial interference interface with the casing 242 to achieve its magnetic flux connection. A travel stop 290 is also provided to keep the armature magnetically latching by axial contact with the interface of the casing and flux tube.

Solenoid 307 has a hydraulic portion essentially identical to that of solenoid 207 having a hydraulic body 310 with an axial inlet 316 connected to control pressure in a cross bore 320 connected to supply. Solenoid 307 is a normally low solenoid having an armature 360 which is actuated downward in the direction of the drawing to connect the control pressure 316 with the supply 370. The casing 342 has its open end towards the hydraulic body 310.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A solenoid valve assembly comprising:
  a ferromagnetic casing, said casing forming a generally tubular envelope;
  a flux tube unitarily integrally formed as one piece with said casing and extending axially generally there from defining an axially extending annular space there between, said flux tube having a first portion connected with said casing and a second portion integral integrally formed as one piece with said first portion but divided there from by a flux choke;

an armature aligned and slidably mounted within said flux tube for imparting movement to a valve member;

a coil and bobbin assembly axially insertable into said axially extending annular space positioned within said axially extending annular space for activating said armature; and a ferromagnetic flux washer axially abutting said flux tube, and magnetically connecting said flux tube with said casing via a radial interference with said casing, said flux washer additionally sealably engaging and compressing said coil and bobbin assembly along an axial plane coterminous with an axial end of said flux tube.

2. A solenoid valve as described in claim 1 wherein said solenoid valve is immersable.

3. A solenoid valve as described in claim 1 wherein said flux washer is on a axial side of said casing opposite said valve member.

4. A solenoid valve as described in claim 1 wherein said flux washer is on a on a side of said casing adjacent to said valve member.

5. A solenoid valve as described in claim 1 wherein said flux choke is on an end of said flux tube generally adjacent to said valve member.

6. A solenoid valve as described in claim 1 wherein said flux choke on said flux tube is on an end of said flux tube generally opposite said valve member.

7. A solenoid valve as described in claim 1 wherein said flux washer places an axial load on said coil and bobbin assembly.

8. A solenoid valve as described in claim 1 wherein an electric connector for said solenoid valve is located on said flux washer.

9. A solenoid valve as described in claim 1 wherein a top end of said casing mounts an electrical connector for said solenoid valve.

10. A solenoid valve as described in claim 7 wherein said bobbin has a shoulder with respect to said flux washer.

11. A solenoid valve as described in claim 1 wherein the casing is forged.

12. A solenoid valve as described in claim 1 wherein the casing is deep drawn.

13. A solenoid valve assembly comprising:

a hydraulic body, said hydraulic body having a generally axial tubular passage with at least one inlet and one outlet;

a spool valve slidably mounted within said hydraulic body tubular passage controlling fluid flow between said inlet and outlet;

a ferromagnetic casing connected with said hydraulic body, said casing forming a generally tubular envelope;

a flux tube unitarily integrally formed as one piece with said casing and extending axially generally there from defining an axially extending annular space there between, said flux tube having a first portion connected with said casing and a second portion integral integrally formed as one piece with said first portion but divided there from by a flux choke;

an armature aligned and slidably mounted within said flux tube for imparting movement to said spool valve;

a coil and bobbin assembly axially insertable into said axially extending annular space positioned within said axially extending annular space for activating said armature; and a ferromagnetic flux washer axially abutting said flux tube, and magnetically connecting said flux tube with said casing via a radial interference with said casing, said flux washer additionally sealably engaging and compressing said coil and bobbin assembly along an axial plane coterminous with an axial end of said flux tube.

14. A solenoid valve as described in claim 1 with a non-magnetic travel stop positioned within said flux tube.

15. A solenoid valve as described in claim 14 wherein said travel stop is contacting said flux washer.

* * * * *